United States Patent [19]

Someya et al.

[11] Patent Number: 4,757,388
[45] Date of Patent: Jul. 12, 1988

[54] CAMERA WITH ELECTRONIC VIEW FINDER VIEWABLE FROM EITHER BEHIND OR IN FRONT OF THE CAMERA

[75] Inventors: Hiromi Someya; Yoshihiko Aihara; Toru Nagata, all of Kanagawa, Japan

[73] Assignee: Canon Kabushiki Kaisha, Tokyo, Japan

[21] Appl. No.: 894,614

[22] Filed: Aug. 8, 1986

[30] Foreign Application Priority Data

Aug. 9, 1985 [JP] Japan .................. 60-175462
Aug. 9, 1985 [JP] Japan .................. 60-175463
Aug. 9, 1985 [JP] Japan .................. 60-175472

[51] Int. Cl.$^4$ ............................................. H04N 5/30
[52] U.S. Cl. ..................... 358/224; 358/209; 358/909
[58] Field of Search ............... 358/909, 180, 224, 209; 354/223

[56] References Cited

U.S. PATENT DOCUMENTS 4,375,653  3/1983  Staley ........................ 358/224
4,550,343  10/1985  Nakatani ................... 358/224

Primary Examiner—Jin F. Ng
Assistant Examiner—Stephen Brinich
Attorney, Agent, or Firm—Toren, McGeady & Associates

[57] ABSTRACT

In a camera having an electronic finder for converting an object image formed by an image forming optical system of the camera to electrical signals and performing a display in response to said signals, apparatus is provided for supporting the electronic finder in such a way as to enable the electronic finder to be observed from either the front or the rear of the camera, and a control circuit is provided for changing the display state of the electronic finder in response to the support state of the supporting apparatus.

59 Claims, 7 Drawing Sheets

F I G.12

CAMERA WITH ELECTRONIC VIEW FINDER VIEWABLE FROM EITHER BEHIND OR IN FRONT OF THE CAMERA

BACKGROUND OF THE INVENTION

1. Field of the Invention:

This invention relates to silver-halide film cameras or video cameras with an electronic viewfinder.

2. Description of the Related Art:

In the past, the finder systems of the silver-halide film cameras and video cameras have been of the optical type. Said finders generally had the eye point of about 20 mm. Even what is so-called the high eye point was about 70 mm. Therefore, when the distance from the observing position to the eyepiece lens of the finder was long, the finder image could not be observed.

By the way, in recent years, as the development of solid state image pickup elements and display elements has rapidly advanced, very small TV or still cameras having built-in CCDs or like elements are commercialized or shown off, and TVs of the wrist watch size or pocket size having TFT liquid crystal displays incorporated therein are also sold in the market. This has led to a possibility of making up an electronic finder for replacing the optical type finder such as the pentagonal prism in not only video movie cameras but also still cameras.

The use of such an electronic finder device in place of the optical type finder produces an advantage that no matter how long the distance from the finder to the observer may be, the finder image can be observed.

In the case of mere replacement, for the finder image to be observed, the observation of the finder image is be possible only from the back cover side of the camera. If that is all that may be done, the potential of the electronic finder device cannot be said to be fully utilized. And, much more room for improving a wide variety of features has been left.

SUMMARY OF THE INVENTION

A first object of the present invention is to provide a camera having an electronic finder device with a novel operating mechanism.

Under such an object, the present invention is to make it possible to observe the finder device from either the front or the rear of the camera. It is, therefore, a second object to provide a camera having such a feature.

Also, it is a third object to provide a camera in which, when the electronic finder device is observed from the front of the camera, a display of no sense of incompatibility is performed.

Also, under the second object, a third object of the invention is provide with simple means making it possible to observe the electronic finder device from the front or rear of the camera.

Under such an object, according to a preferred embodiment of the present invention, in the camera having the electronic finder which converts an object image formed by the image forming optical system of the camera to electrical signals and performs the display based on said signals, an electronic finder camera provided with at least support means for supporting the electronic finder so as to be able to observe the above-described electronic finder from either of the front and rear of the camera by selection.

Also, another object of the present invention is to provide a novel display form of the electronic viewfinder.

Other objects and features of the invention will become apparent from the following description of embodiments thereof.

BRIEF DESCRIPTION OF THE DRAWINGS

FIGS. 8(a) to 10(b) are plan views explaining the operation of the processing circuit 53.

DETAILED DESCRIPTION OF THE PREFERRED EMBODIMENTS

Figure 1:
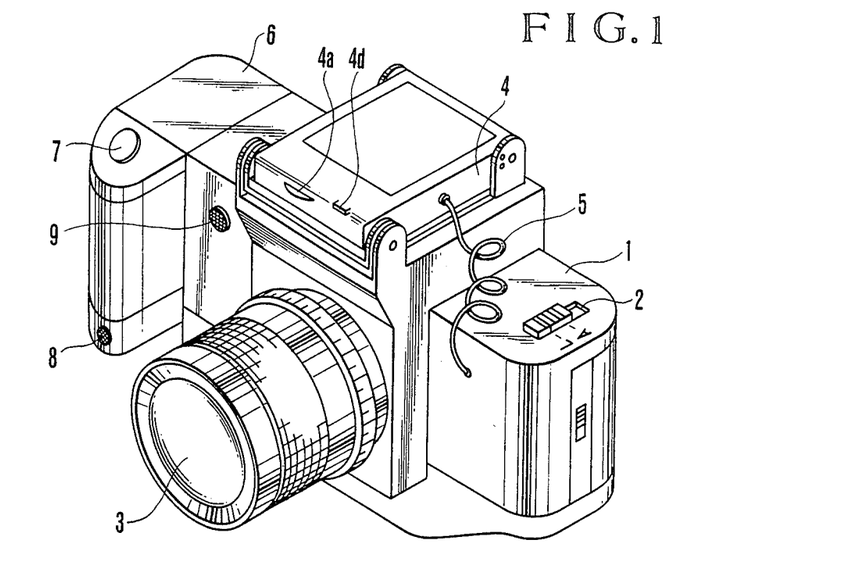
FIG. 1 is a perspective view of an embodiment of the electronic finder camera according to the present invention.

FIGS. 1 to 4 are drawings explaining an embodiment of the camera having the electronic finder according to the invention, with FIG. 1 being a perspective view illustrating the outline. In FIG. 1, a camera body 1 has a power switch 2, a photographic lens 3, an electronic viewfinder 4, a connector cord 5 through which the circuit in the camera body 1 is connected to the circuit of the electronic viewfinder 4, a grip 6 releasably attached to the camera body 1 and having a remote control function, a release button 7, a release signal light-emitter 8 comprised of an LED and others, and a release signal receptor 9 comprised of a silicon photo-cell and others.

Figure 2:
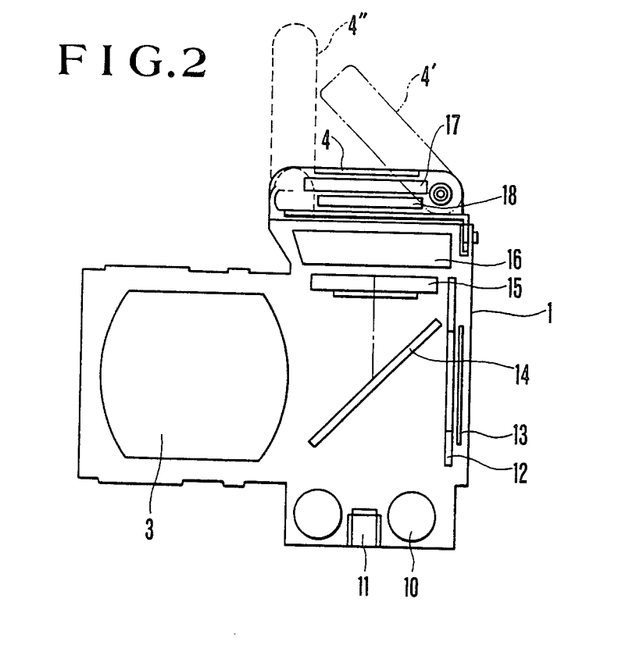
FIG. 2 is a sectional view of the electronic finder camera of FIG. 1.

FIG. 2 is a sectional view of the embodiment shown in FIG. 1. 10 is a battery as the power source for driving a film transportation mechanism, a shutter, a diaphragm (not shown), a CDD and a display element; 11 is a tripod bushing; 12 is a shutter; 13 is film; 14 is a 45° mirror consisting of a half mirror for splitting the light coming from an object to be photographed and passing through the photographic lens 3 to the film 13 and a CCD area sensor 15. The CCD area sensor 15 lies in a positon optically equivalent to the film 13. 16 is an electrical unit having mounted therein a circuit for driving the CCD area sensor 15; 17 is a display element such as that made of TFT liquid crystal and its drive circuit; 18 is an illumination device for illuminating the display element 17. 4' and 4" represent, respectively, the states of the electronic finder 4 when in usual photography and when in self or remote control photography.

Figures 3, 4:
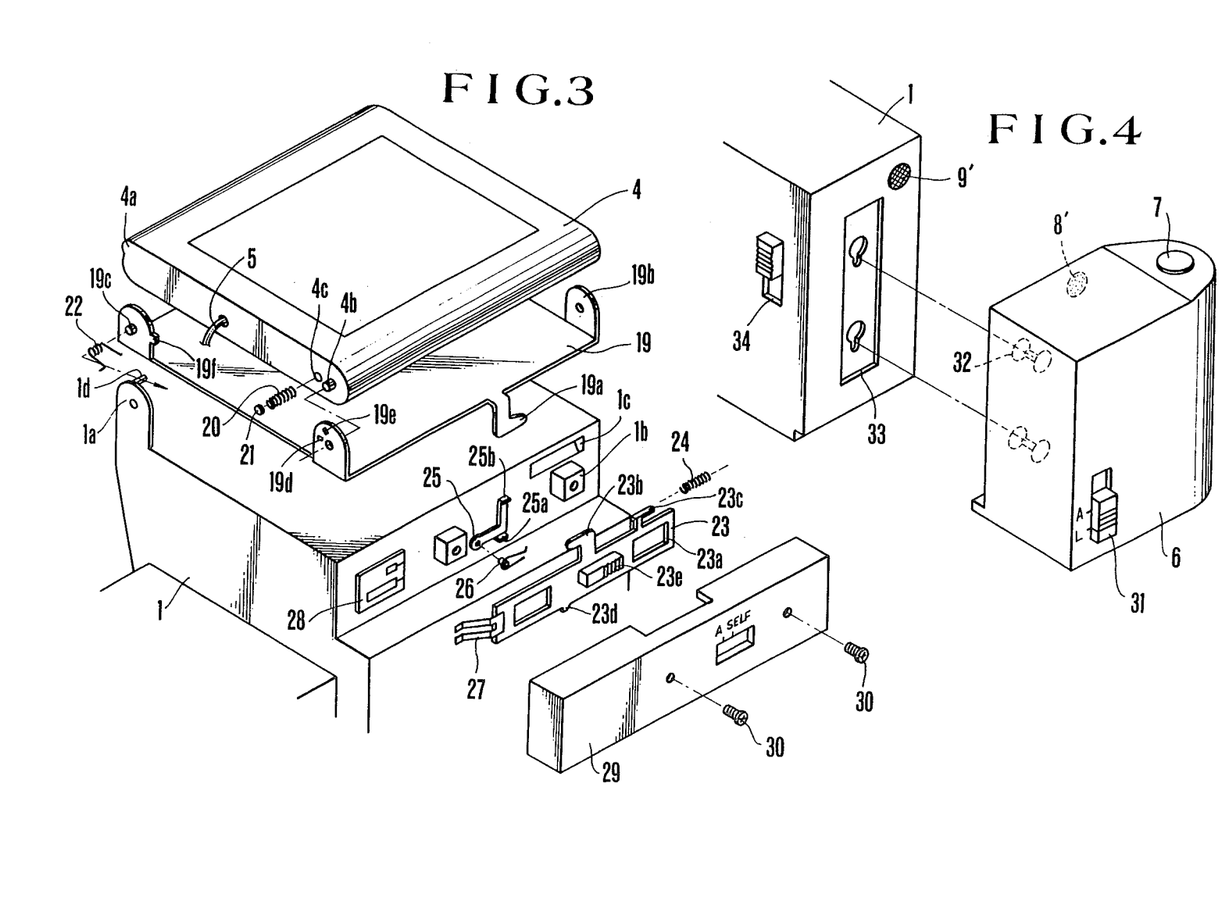
FIG. 3 is an exploded perspective view illustrating the details in the neighborhood of the electronic finder 4 shown in FIG. 1.
FIG. 4 is an exploded perspective view of the neighborhood of the grip 6 shown in FIG. 1.

FIG. 3 is an exploded perspective view illustrating the details of the parts between the electronic finder 4 and the camera body 1. A support plate 19 has a hook 19a which, upon engagement with a latch lever 23, holds the electronic finder 4 in a collapsed position, and rotatably engages with studs 4b of the electronic finder 4 at hole-opened extensions 19b. A coil spring 20 and a steel ball 21 are inserted in a hole 4c of the electronic finder 4 and engages a long hole portion 19d of the support plate 19 when the display device 4 is in the callapsed position, or another long hole portion 19e when in photographic position. Thus, the photographic position is held. Also, in the support plate 19 there are studs 19c rotatably engaging hole-opened extensions 1a of the camera body 1. A torsion coil spring 22 engages this, urging the support plate 19 in a direction (counter-clockwise direction as viewed in the drawing) to the position for use with a self-timer. The latch lever 23 slidably engages projections 1b of the camera body at long slots 23a, and the pawled portion 23b engages the pawled portion 19a of the above-described support plate 19. Also, one end of a coil spring 24 engages a projected portion 23c. The other end of the coil spring 24 abuts on a recessed portion of semi-cylindrical shape of the camera body to urge the latch lever 23 in a direction (leftward direction as viewed in the drawing) to engage the pawled portions 19a and 23b with each other. A projected portion 23d engages a latch lever 25. When the electronic finder 4 is set in the self-in-use position, a pawled portion 25a of the lever 25 engages the pawled portion 23d, holding the latch lever 23. When the electronic finder 4 is moved to the collapsed position, the pawled portion 19a pushes the pawled portion 25b against the bias force of the spring 26 to release the engagement of the pawled portion 25a with the pawled portion 23d. The latch lever 23 is then slid to the left by the spring 24 until the pawled portion 19a and the pawled portion 23b engage each other. 27 is a contact; and 28 is a substrate. The contact 27 is fixed to the latch lever 23, and constitutes a switch which slides on the substrate as the latch lever 23 moves. This switch turns on in the self-timer- or remote control-in-use position. A casing member or latch cover 29 is fixed to the camera body 1 by screw fasteners 30. 23e is a latch knob the operator's finger touches when to sliding the latch lever 23.

FIG. 4 is an exploded perspective view of the grip 6 and its neighborhood. A power switch 31 controls the supply of electrical power from a battery (not shown) within the grip to the LED and others of the above-described release signal light-emitting portion 8. Also, 8', too, is a release signal light emitting portion which confronts a release signal light receiving portion 9' in the camera body when the grip is attached to the camera body, so that transferring of the release signal is performed. Grip locking hooks 32 engage a locking plate 33 of the camera body 1. The engaging position of the locking plate 33 with the locking hooks 32 becomes a large round portion by sliding the slide knob 34 (downward as viewed in the drawing), thereby the grip locking hooks 32 are removed. Thus, the grip 6 becomes usable as a remote control.

Next, the photographic operation will be explained.

At first, when normal photography is performed, the power switch 2 is moved from L to A position. Also, in the beginning, the grip 6 is assumed to be attached to the camera body 1. Thereby, the drive circuit for the image pickup element 15 and the display element 17 and the illumination device 18 are supplied with electrical power. An object image, from the light passing through the photographic lens 3 and reflected from the 45° mirror 14, is formed on the CCD area sensor 15, and converted into video signals, being displayed in the display element 17. Next, in order to set the finder in a position easy to view, the operator touches his finger on the abutting portion 4a and moves it to the position 4' in FIG. 2. In this case, the steel ball 21 moves against the spring 20, changing its click stop position from the long hole portion 19d to 19e. Subsequently, the power switch 31 of the grrp 6 is thrown to render the camera releasable Next, with a desired object in focus, when the release button 7 is pushed down, the release signal light emitting portions 8 and 8' produce light. The release signal light receiving portion 9' receives this light and the camera performs computation of an exposure value. The shutter time and the aperture size are controlled on a desired program line. The film 13 is exposed. By a film feeding mechanism (not shown), a one-frame feeding is performed.

Next, in case when shooting is made with the self-timer, the operator turns the electronic finder 4 to the collapsed position, and then slides the knob 23e against the spring 24. The engagement of the pawled portion 23b and the pawled portion 19a is released. The electronic finder 4 is turned by the force of the spring 22 until a stopper portion 19f abuts on a body stopper portion 1d. That is, in FIG. 2, the position shown by 4'' is assumed. In addition, the contact 27 slides on the substrate 28 so that the self-timer or remote control setting switch comprised of the contact 27 and the substrate 28 turns on. In this position, the pawled portion 23d and the pawled portion 25a engage each other and the latch lever 23 is locked. Next, the slide knob 34 is slid to remove the grip 6 from the camera body 1. Then, the operator stands in front of the camera with the composition and focusing being previously determined, and, while looking at the finder 4, determines his position within the finder. Then, he pushes down the release button 7, thereby the release signal light emitting portions 8 and 8' are lighted on. This is received by the release signal light receiving portion 9. After 1 sec. from this time, the camera body performs a release operation.

In the above-described embodiment, the finder device is pivotally supported so as to be able to observe the electronic finder from either the rear surface of the camera when in usual photography or the front surface of the camera when in self-timer photography or remote photography, and, as the finder device is turned about said pivot shaft to the position for self-timer photography or remote photography, the display of the finder is vertically inverted to that when in usual photography so that the finder image appears erect. Therefore, when in self-timer photography or remote photography, the display of the finder as viewed from the front surface of the camera is also reversed in the horizontal direction, so that the moving direction of the object displayed in the finder coincides with the direction in which the object actually moves. But, in another case where, as the finder portion is detachable, the finder image is viewed at hand when in remote photography or where the finder is turned about axes perpendicular to each other between when in usual photography and when in remote photography, compared with the picture when in normal photography, only the left to the right must be reversely treated. About this case, though the figure number gets out of order, by using FIG. 11, explanation is made below.

Figure 11:
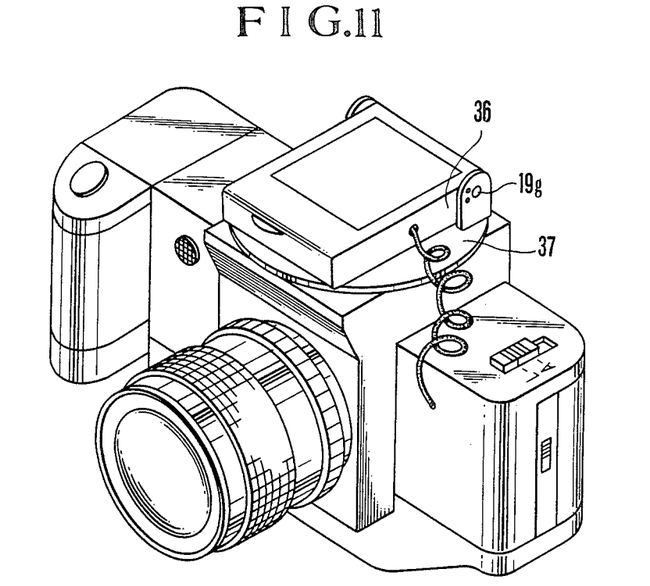
FIG. 11 is a perspective view of another embodiment of the electronic finder camera according to the present invention.

FIG. 11 is a perspective view of another embodiment of the electronic finder camera according to the present invention corresponding to FIG. 1 of the above-described embodiment. In the embodiment shown in FIG. 11, the finder 4 shown in FIG. 1 is replaced by a finder 36.

Here, the mechanism for holding the finder 36 in the position shown by double dot-and-dash line 4' of FIG. 2 to make easy to view it from the rear surface of the camera when in usual photography is the same as that of the embodiment shown in FIG. 1. However, in this embodiment, instead of providing the shaft 19c parallel to the shaft 4b as in the embodiment shown in FIG. 3, a turntable 37, which is made rotatable, is provided so as to be able to observe the finder image from the front surface of the camera when in self-timer photography or remote photography.

Next, the arrangement of the turntable 37 shown in FIG. 11 will be explained by using FIG. 12.

Figure 12:
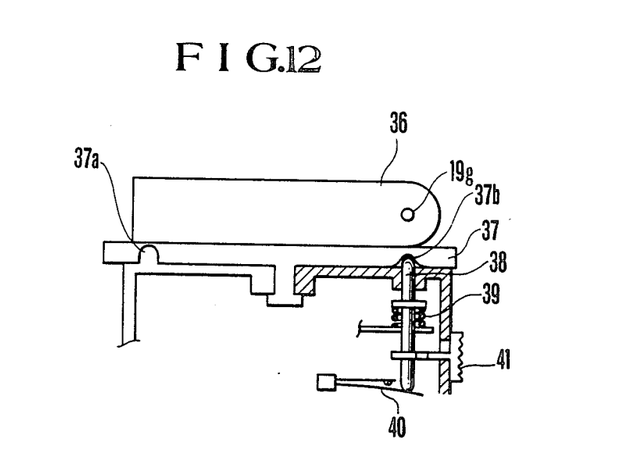
FIG. 12 is a sectional view of the neighbourhood of the turntable 37 shown in FIG. 11.

FIG. 12 is a sectional view of the turntable 37 and its neighborhood of the electronic finder camera shown in FIG. 11. In FIG. 12, 19g is a shaft; 38 is a shaft urged upward by a spring 39 as viewed in the drawing. A switch 40 changes its state in response to the shaft 38. An operating knob 41 is fixedly mounted to the shaft 38, and arranged on the rear surface of the camera. It should be noted that 37a and 37b are holes provided in the turntable 37. The tip of the shaft 38 fits in each of the holes 37a and 37b. The depths of the holes 37a, 37b are so determined that when the shaft 38 fits in the hole 37b, the switch 40 is off, and when the shaft 38 fits in the hole 37a, the switch 40 is on.

Here, the state shown in FIG. 11 represents the usual photography position where the electronic finder 4 is observed from the rear surface of the camera. In this case, the tip of the shaft 38 fits in the hole 37b of the turntable 37. In this case, as has been explained in FIG. 3, if the finder 36 is turned about the shaft 19g, the finder 36 becomes easy to observe from the rear surface of camera. Also, in this case, the switch 40 becomes off. Next, when in self-timer or remote photography, the knob 41 is slid downward to release the fitting engagement of the shaft 38 and hole 37b. The turntable 37 is then turned until the shaft 38 fits in the hole 37a. Also, in this case, the switch 40 turns on. Hence, the finder 36 is reversed horizontally as compared with the position of FIG. 12. Then, the finder 36 is turned about the shaft 19, becoming easy to observe from the front surface of the camera.

In this embodiment, because the finder 36 is turned by the turntable 37, not only when in usual photography, but also when in self or remote photography, there is no vertical inversion of the display of the finder 36. But, the display of the finder 36 is horizontally reversed in response to turning-on of the switch 40 as the turntables 37 turns. When the finder is observed from the front surface of the camera, the moving direction of the object displayed in the finder coincides with the moving direction of the actually moving object. Hence, particularly when a shot is made after the photographer himself has moved so as to be displayed in the finder, there is an advantage that the convenience of use improves.

Next, the electrical circuit of the electronic finder camera of this embodiment described above will be explained.

Figure 5:
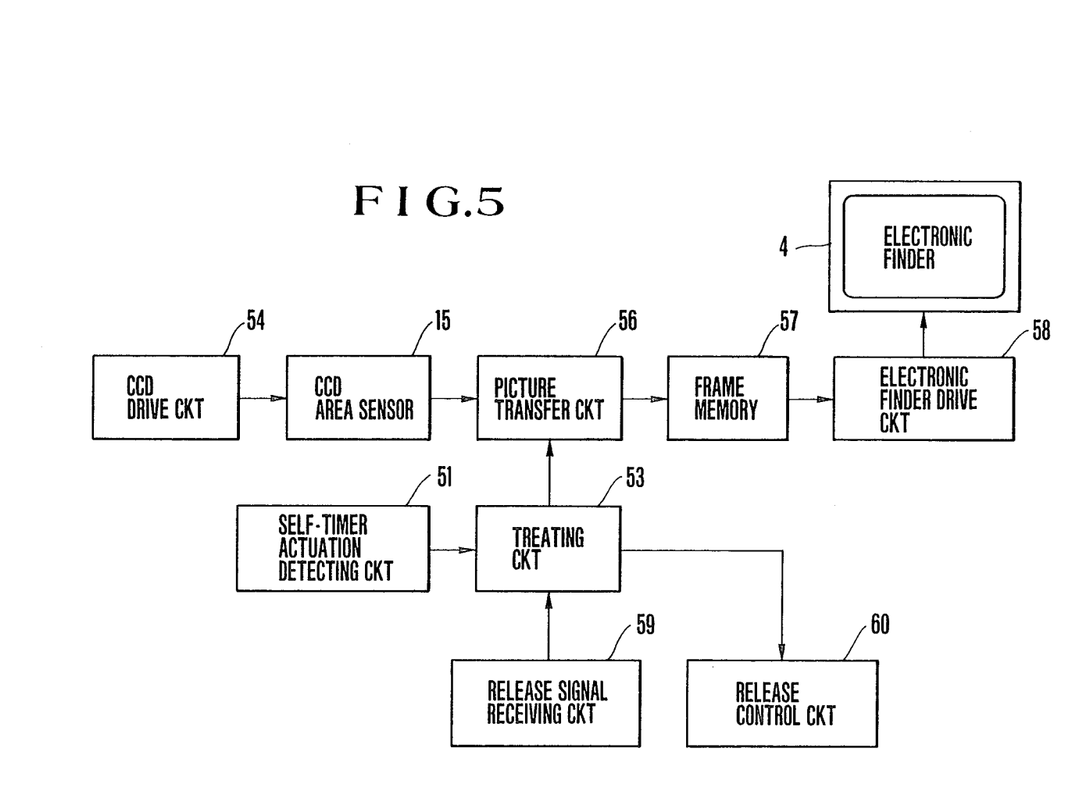
FIG. 5 is a block diagram of the circuitry of the electronic finder camera shown in FIG. 1.

FIG. 5 is a block diagram of the electrical circuit of the electronic finder camera of this embodiment. In FIG. 5, 51 is a self-timer actuation detecting circuit for determining whether or not the camera is in the self-timer mode or the remote control mode by detecting the state of the switch comprised of the contact 27 and substrate 28 shown in FIG. 3; 54 is a drive circuit for driving the CCD area sensor 15; 56 is a picture transfer circuit for transferring the output of the CCD area sensor 15 to a frame memory 57 in response to a control signal of a treating circuit 53. 57 is the frame memory; 58 is an electronic finder drive circuit for driving the electronic finder 4 based on the picture information sent from the frame memory 57. 59 is a release signal receiving circuit for sensing the release signal to the treating circuit 53 in response to signal from the release signal light receiving portion 9 shown in FIG. 1; 60 is a release control circuit for driving the shutter and diaphragm in response to the signal produced from the treating circuit 53 in response to the release signal from the release signal receiving circuit 59; 53 is the treating circuit for driving the picture transfer circuit 56 and the release control circuit 60 in response to the signals of the self-timer actuation detecting circuit 51 and the release signal receiving circuit 59.

Figure 6:
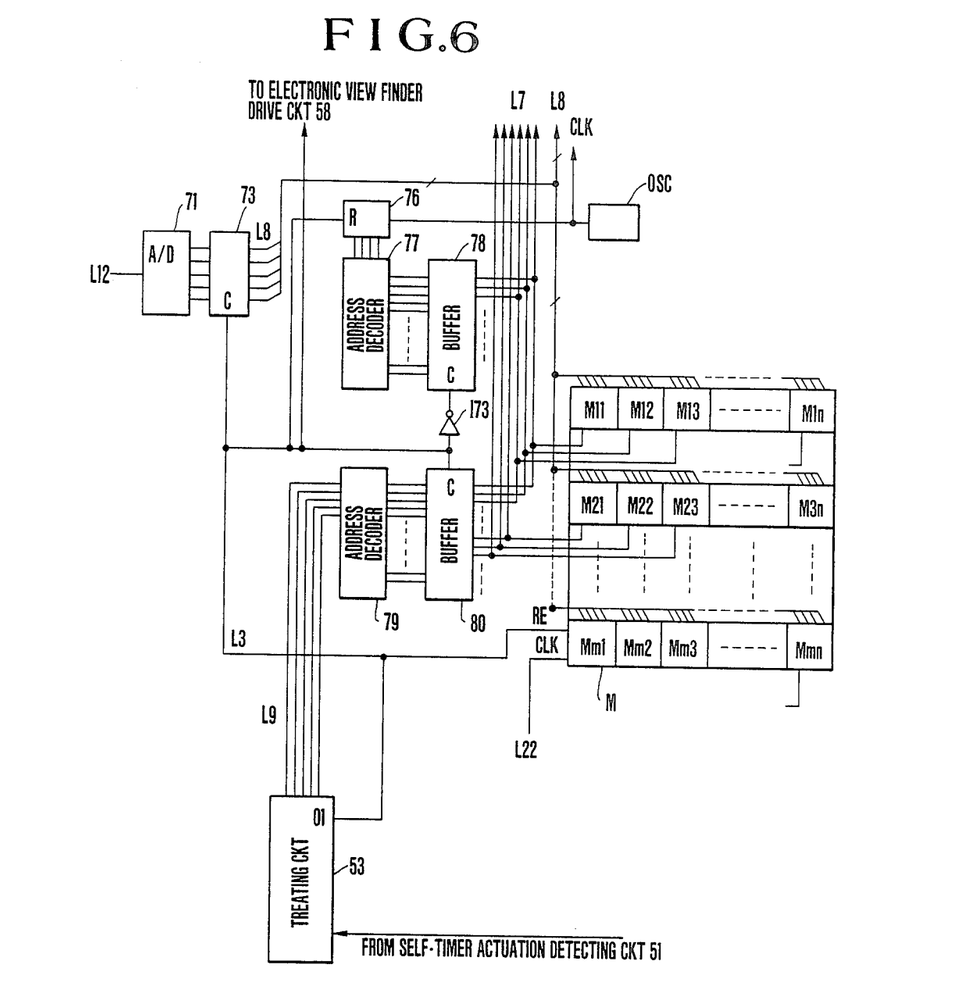
FIG. 6 is a block diagram illustrating the details of the picture transfer circuit 56 and frame memory 57 shown in FIG. 5 and the relationship between said circuit and the processing circuit 53.

Next, the details of the picture transfer circuit 56 and frame memory 57 and the relationship between the treating circuit 53 and each of the picture transfer circuit 56 and the frame memory 57 are explained in detail by using FIG. 6.

In FIG. 6, 71 is an A/D converter for converting a picture element signal from an analog quantity inputted from the CCD area sensor 15 through a signal line L12 to a digital value; 73 is a bus buffer for selecting whether or not the digital signal produced from the A/D converter 71 is outputted to data bus lines L8. When a signal of high level is applied to a C input terminal, the bus buffer produces signals in the data bus lines. A signal L3 from the treating circuit 53 is applied to the C input terminal of the bus buffer 73.

Next, the constituent elements of the frame memory 57 will be explained.

OSC is a pulse oscillator; 76 is a counter which is in reset state when the L3 signal is high level, and begins a counting state when the signal L3 inverts from high level to low level. 77 and 79 are address decoders, and 78 and 80 are address buffers. When the L3 signal becomes low level, the counter 76 always counts the pulses from the pulse oscillator OSC. Also, the counter 76 has a count capacity corresponding to the memory number of the frame memory M. When the count-up state is reached, it then automatically resets. The address decoder 77 produces a corresponding memory address corresponding to the counted value of the counter 76. This address is accessed through the address bus buffer 78 by each memory in the frame memory. Also, the address decoder 79, receptive of address data inputted from the treating circuit 53 through signal lines L9, produces a memory address corresponding to this value. This address is accessed through the address bus buffer 80 also to each memory M11–Mmn in the frame memory M. The address bus buffer 78 and the address bus buffer 80 are the address bus buffers for selecting whether or not the output signals of the address decoders 77 and 79, respectively, are outputted to the address bus lines. Both produce signals for the address bus lines when the signal of high level is applied to their C input terminals. The signal L3 is applied to the C input terminal of the address bus buffer 80. The signal L3 is applied through the inverter I73 to the C input terminal of the address bus buffer 78. M is a frame memory. The frame memory M performs a writing operation of the data bus signal when a signal of high level is applied to an RE input terminal thereof, and performs outputting of data when a signal of low level is applied thereto. The signal line L3 is applied also to the RE input terminal. Also, the output terminal 01 of the treating circut 53 is a terminal at which the L3 signal is produce-d for selectively driving the bus buffer 73 and the address buffers 78 and 80. When the data are written in the memory M, it becomes high level, and when the data are read out from the memory M, it becomes low level.

Next, the operation of the picture transfer circuit 56, frame memory 57 and treating circuit 53 constructed in such a way as above will be explained.

Figure 7:
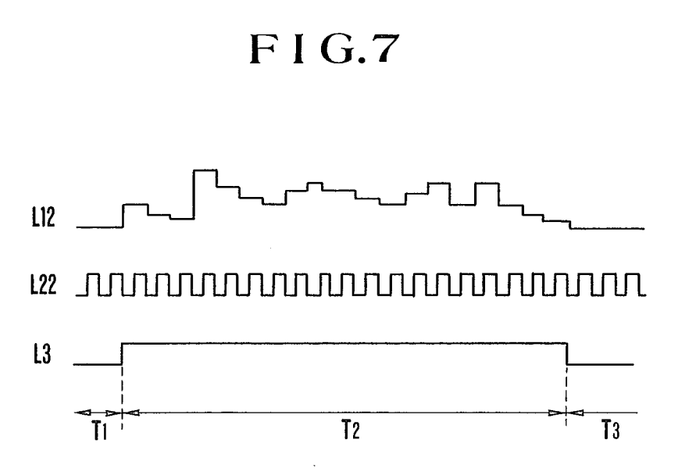
FIG. 7 is a timing chart of the L22 signal, L12 signal and L3 signal shown in FIG. 6.

At first, using FIG. 7, we explain about the relationship between the L12 signal inputted to the A/D converter 71 of the picture transfer circuit 56, an L22 signal of the clock input CLK inputted to the memory M, and the L3 signal outputted from the output terminal 01 of the treating circuit 53.

During the period T1 where the signal L3 is low level, because the signal L3 after having been inverted to high level by the inverter I73 is applied to the C input terminal of the address bus buffer 78, the address bus buffer 78 outputs the output signal of the address decoder 77 to the address bus lines. Meanwhile, because the signal L3 of low level is applied without alternation to the C input terminal of the address bus buffer 80, it becomes high impedance state to the address bus lines, so that outputting of the data is not performed. Also, because the signal of low level is applied to the C input terminal of the data bus buffer 73, it becomes a high impedance state to the data bus lines, so that outputting of the data is not performed.

Also, because the L3 signal of low level is applied to the RE input terminal of the frame memory M, and the address decoder 77 decodes the output data of the counter 76, the memory corresponding to this decode address outputs its content to the data bus lines. Also, in this state, the oscillator OSC always repeatedly produces pulses, and the counter 76 always performs the counting operation. Therefore, suppose, for example, the memory M11 within the frame memory M was read out and its memory content has been outputted, the address decoder next indicates the memory M12, and the memory M12 outputs its memory content to the data bus L8. As the indicated address of the address decoder increases in such a way, the memories M11, M12, M13 . . . to M21, M22, M23 . . . are read out in sequence. At a time when the reading-out of all of the frame memory has completed, the counter 76 is automatically reset, so that the reading-out returns to the memory M11 again, and continues operating in a similar manner. The data read out from each memory are transmitted through the data bus line L8 to the electgronic finder drive circuit 58. Also the address data are transmitted through the address data bus lines L7 to the electronic finder drive circuit 58. The electronic viewfinder drive circuit 58 drives the electronic finder 4 to display on the basis of the transmitted information.

Next, we explain about a period T2 where video signals are time-serially produced from the signal line L12 at a point in time when the accumulation of signals in the CCD area sensor 15 has completed. In this case, as shown in FIG. 7, at the same time when the video signals are produced, the signal L3 changes over from low level to high level. As a result, because the signal of high level is applied to the C input terminal of the data bus buffer 73, the bus buffer 73 outputs the output of the A/D converter 71 or the digital conversion value to the data bus line. Because the signal of high level from the signal L3 is applied to the C input terminal of the address bus buffer 80, the address decoder 79 performs the address indication of particular memories within the frame memory through the address bus buffer 80. The memory of the indicated address writes in the output value of the data bus buffer 73 in synchronism with the rising edge of the L22 signal inputted to the CLK input terminal. The address decoder 79 indicates a particular memory in the frame memory according to the address data the treating circuit 53 produces. The A/D converted value is written in this memory. The memories are indicataed in the order of M11, M12, M13 . . . M21, M22, . . . by the treating circuit, and the A/D converted values are being written in. In this case, the picture produced from the CCD area sensor 15 is written in the frame memory M in such a manner as to be always viewed as theerect image from the photographer, depending on the state of the electronic finder 4. At a time when the transmission of picture information for one frame has completed, the signal L3 changes to low level again, terminating the writing-in operation. Until the start of the next writing-in operation, the reading-out only is performed again.

Next, the writing-in of the data which is performed in response to address produced from the treating circuit 53 by suing FIGS. 8(a) to 10(b) will be explained.

Figure 8A:
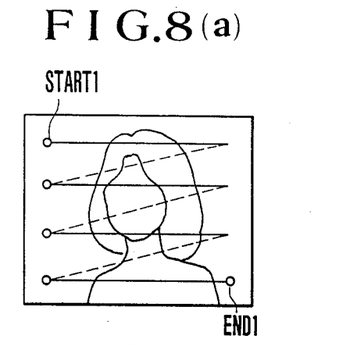
Figure 8B:
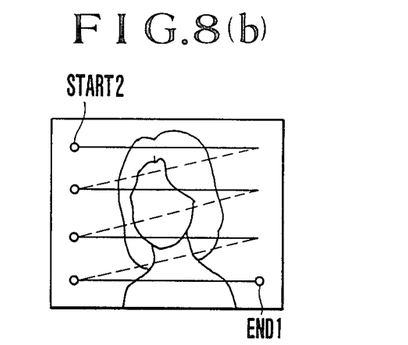
Figure 9A:
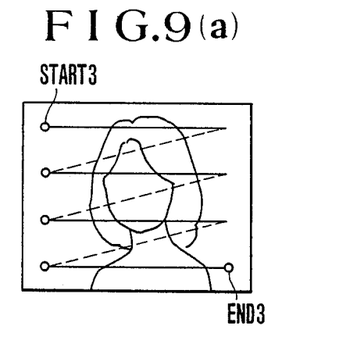
Figure 9B:
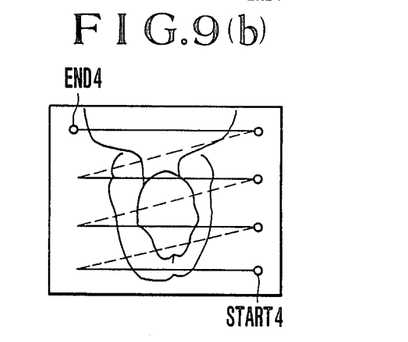
Figure 10A:
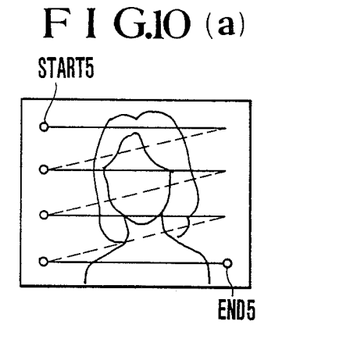
Figure 10B:
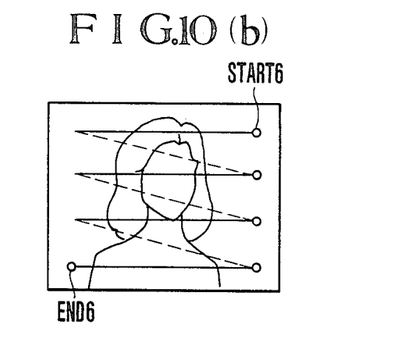

FIGS. 8(a), 9(a), 10(a) are plan views illustrating the sequence of reading out the object image carried out in the CCD area sensor 15 (not the image formed on the CCD area sensor 15 but the image of the object viewed from the camera side) and FIGS. 8(b) 9(b) and 10(b) are similar views illustrating the sequence of transferring and writing it in the frame memory M.

It should be noted that the sequence of reading out the signals from the CCD area sensor 15 is always the same. But, in this embodiment, all is shown for the purpose of comparison with the sequence of writing in the frame memory M.

FIGS. 8(a) and 8(b) are plan views illustrating the sequence of reading out the object image performed in the CCD area sensor 15 when the electronic finder 4 is flipped upward to the position shown by 4' in FIG. 2, and the sequence of transferring and writing it in the frame memory M performed by the treating circuit.

In such a case, the reading-out of the output of the CCD area sensor 15 is performed in sequence from a readout start position shown as START1 of FIG. 8(a) to a readout end position shown as END1. That is, the picture elements of horizontal direction are outputted in sequence. After the first line ends, the second line is outputted in sequence to the horizontal direction. The transfer of picture information for one frame ends where the output ends up to the place of END1 of the last line. The writing-in of the picture information starts from the memory of the start position shown as START2 of FIG. 8(b) of the frame memory M, and goes to the memories of horizontal direction in sequence. After the first line ends, the second line is written in sequentially to the horizontal direction. The writing-in is performed till the memory of the end position shown as END2 of the last line. Also, since, as has been described above, the reading-out of the picture information from the frame memory M is performed in the order of from M11 to M12 . . . M1n, M21 . . . M2n, M31 . . . M3n, . . . Mm1 . . . Mmn, it results that the picture displayed in the electronic view finder 4 coincides in vertical and horizontal orientation with the object image viewed from the camera side.

FIGS. 9(a) and 9(b) are plan views illustrating the sequence of reading out the object image performed in the CCD area sensor 15 when the electronic view finder 4 is flipped upward to the position shown by 4" in FIG. 2 as self photography or remote photography is carried out, and the sequence of transferring and writing it in the frame memory M performed by the treating circuit 53. The reading-out of the output of the CCD area sensor 15 in such a case is performed in a similar manner to that shown in FIG. 8(a). But, the writ n to the frame memory M is performed in sequence from the position shown at START4 to the position shown at END4. Since, as has been described above, the reading-out of the picture information from the frame memory M is performed in response to the counted value of the counter 76, the display in the electronic view finder 4 is vertically invertedly performed so that when seen from the front surface of the camera, the display of the electronic view finder 4 is observed as the erected image. Also, in such a case, the display of the finder is reversed horizontally, and the moving direction of the object displayed in the finder coincides with the direction in which the object actually moves. When remote photography or self-timer photography is carried out, the convenience of use is very good.

FIGS. 10(a) and 10(b) are plan views illustrating the sequence of reading out the object image performed in the CCD area sensor 15 when, in the other embodiment of the invention shown in FIG. 11, the turn table 37 is turned and the electronic finder 36 is viewed from the front surface of the camera, and the sequence of transferring and writing it in the frame memory M performed by the treating circuit 53.

The reading-out of the output of the CCD area sensor 15 in such a case is performed in a similar manner to that described above. But the writing-in to the frame memory M is performed in sequence from the position shown at START6 to the position shown at END6. Since, similarly to the above, the reading-out of the signals from the frame memory M is performed in response to the counted value of the counter 76 the display of the electronic finder 36 is reversed horrzontally, but the moving direction of the object displayed in the electronic finder 36 from the front surface of the camera coincides with the direction in which the object actually moves. When remote photography or self-timer photography is carried out, the convenience of use is very good.

According to the embodiments of the invention described above, the electronic finder device can be supported so as to be observable selectively from either of the front and rear surfaces of the camera.

It should be noted in that case, if the arrangement shown in FIG. 1 to FIG. 4 is employed, when in usual photography, if the electronic finder is flipped upward to the position shown as 4' of FIG. 2, that is, to an angle of about 45° with the optical axis, it can be made the position very easy to view from the side of the user. When in self-timer photography or remote photography, it can be made the position very easy to view from the object side of the front surface of the camera. Further, in case when photography is not carried out, it can be folded to compact. Further, in FIG. 6, the picture information of the CCD area sensor 15 is written in the frame memory M by using the treating circuit 53 as shown in FIGS. 8(a) to 10(b), and then read out in response to the counted value of the counter 76. This makes it possible that when the electronic finder has been supported so as to be observable from the object s the direction in which the object moves coincides with the direction in which the object displayed on the finder moves. Further, when the arrangement shown in FIG. 1 to FIG. 4 is employed, even if the electronic finder is flipped upward to the position shown as 4", the erected image can be observed when said finder is observed from the object side of the camera front surface.

In the embodiments of the invention, the support means for supporting the electronic finder so as to be observable from either the front or rear surfaces of the camera by selection is, in the embodiment shown in FIG. 1 to FIG. 4, the hole-opened projected portions 19b of the support plate 19, the shaft 4b of the electronic finder 4 fitted in said projected portions, and the projected portions 19c and the hole-opened projected portions 1a of the camera body, and in, the embodiment shown in FIG. 11 and FIG. 12, the turntable 37 and the shaft 19g, and the projected portion having holes fitted on said shaft. But, it is of course possible to employ other arrangements.

According to the embodiments of the invention, the electronic finder is provided with at least support means for supporting it so as to be observable from either of the front and rear surface of the camera by selection, thereby giving an advantage that when in self-timer photography, or remote photography, while observing the finder from the front surface of the camera, the photographer can determine the framing of the camera.

Also, the control means for horizontally reversing the display of the electronic finder, which occurs when it is supported to be observable from the rear surface of the camera in response to support of the electronic finder so as to be observable from the front of the camera has been made the control circuit 53 for changing the sequence of writing picture information in the frame memory M in response to a signal, in the embodiment shown in FIG. 1 to FIG. 4, from the switch comprised of the contact 27 and the substrate 28 whose state changes in response to sliding movement of the latch lever 23 engaging with the pawl portion 19a of the support plate 19 shown in FIG. 3, or, in the embodiment shown in FIG. 11-FIG. 12, either of the signals from the switch 40 and both switch. Without using the frame memory, the display of the electronic finder may be horizontally inverted directly by changing the transfer method in response to the switch of the aforesaid switch when the output of the CCD area sensor 15 is transferred.

As has been described above, according to the embodiments of the invention, because the moving direction of the object displayed on the electronic finder coincides with the direction in which the object actually moves when the electronic finder is observed from the front surface of the camera, an advantage is produced that the use of the camera is very convient.

Also, in the abaove-described embodiments, the electronic finder device is arranged on one end of the camera to be pivotally supported thereby it being made possible to observe said finder from the front surface of the camera by turning the pivotally supported electronic finder device, for example when in self-timer photography. Moreover, when the electronic finder device is made observable from the front surface of the camera, the display of the above-described electronic finder is vertically inverted to the display which takes place when the electronic finder is not turned, thereby it being made possible to observe the erected image even when the electronic finder is observed from the front surface of the camera.

What is claimed is:

1. A camera comprising:
   (a) image pickup means for converting an image into an electrical signal;
   (b) means for displaying an image in response to said electrical signal;
   (c) means for setting a self-timer operation; and
   (d) means for controlling display state of said display means when said set means sets the self-timer operation.

2. A camera according to claim 1, wherein said control means inverts the display state which takes place when the self-timer operation is not set in response to setting of the self-timer operation by said set means.

3. A camera according to claim 1, wherein said display means is observable from at least the front surface of said camera.

4. A camera according to claim 2, wherein said display means is rotatably mounted to said camera.

5. A camera according to claim 2, wherein said control means vertically inverts the displaying state which takes place when the self-timer operation is not set in response to setting of the self-timer operation by said set means.

6. A camera according to claim 2, wherein said control means horizontally inverts the displaying state which takes place when the self-timer operation is not set in response to setting of the self-timer operation by said set means.

7. A camera comprising:
   (a) image pickup means for converting an image into an electrical signal;
   (b) means for displaying an image in response to said electrical signal;
   (c) means for setting a remote control operation; and
   (d) means for controlling said display state of said display means when said set means sets the remote control operation.

8. A camera according to claim 7, wherein said control means inverts the displaying state which takes place when no remote control operation is set in response to setting of the remote control operation by said set means.

9. A camera according to claim 7, wherein said display means is observable from at least the front surface of said camera.

10. A camera according to claim 9, wherein said display means is rotatably mounted to said camera.

11. A camera according to claim 8, wherein said control means vertically inverts the displaying state of which takes place when no remote control operation is set, in response to setting of the remote control operation by said set means.

12. A camera according to calim 8, wherein said control means horizontally reverses the displaying state which takes place when no remote control operation is set, in response to setting the remote control operation by said set means.

13. A camera comprising:
    (a) displaying means for displaying an image electrically;
    (b) self-timer means for performing a self-timer photography; and
    (c) association means for causing an association between an operation of said self-timer means and a state for displaying of said display means.

14. A camera according to claim 13, wherein said association means includes switch means for achieving the association.

15. A camera according to claim 13, wherein said association means includes means for changing a position of the display means.

16. A camera according to claim 15, wherein said position changing means includes means for changing a direction of the display means.

17. A camera according to claim 16, wherein said direction changing means includes means for setting the display means in a first direction enabling observation of said display means at least from the front of the camera, and in a second direction enabling observation of said display means at least from the rear of the camera.

18. A camera according to claim 16, wherein said direction changing means includes means for setting said display means in a direction observable from the front of the camera when said self-timer means operates.

19. A camera according to claim 15, wherein said association means includes display changing means for changing the displaying state of said display means so as to correspond to the position of said display means.

20. A camera according to claim 19, wherein said display changing means includes inverting means for inverting the displaying state of said display means in accordance with the position of said display means.

21. A camera according to claim 20, wherein said inverting means includes means for inverting top to bottom the displaying state.

22. A camera according to claim 21, wherein said inverting means includes means for reversing right to left displaying state.

23. A camera according to claim 20, wherein said inverting means includes means for reversing right to left displaying state.

24. A camera according to claim 19, wherein said display changing means includes switch means for making the displaying state of said display means correspond to the position of said display means.

25. A camera according to claim 13, wherein said association means includes display changing means for changing the displaying state of said display means.

26. A camera according to claim 25, wherein said display changing means includes switch means for changing the display state of said display means.

27. A camera according to claim 25, wherein said display changing means includes means for inverting top to bottom said displaying state.

28. A camera according to claim 27, wherein said display changing means includes means for reversing right to left the displaying state.

29. A camera according to claim 25, wherein said display changing means includes means for reversing right to left the displaying state.

30. A camera according to claim 26, wherein said switch means includes means for inverting top to bottom said displaying state.

31. A camera accoridng to claim 30, wherein said switch means includes means for reversing right to left said displaying state.

32. A camera according to claim 26, wherein said switch means includes means for reversing right to left said displaying state.

33. A camera comprising:

(a) display means for displaying an image electrically;
(b) remote control means for operating said camera by remote control; and
(c) association means for causing association between an operation by said remote control means and a state of displaying by said display means.

34. A camera according to claim 33, wherein said assoication means includes switch means for achieving the association.

35. A camera according to claim 33, wherein said association means includes means for changing a position of the display means.

36. A camera according to claim 35, wherein said position changing means includes means for changing a direction of the display means.

37. A camera according to claim 36, wherein said direction changing means includes means for setting the display means in a first direction enabling observation of said display means at least from the front of the camera, and in a second direction enabling observation of said display means at least from the rear of the camera.

38. A camera according to claim 36, wherein said direction changing means includes means for setting said display means in a direction enabling observation of said display means from the front of said camera when said remote control means operates.

39. A camera according to claim 34, wherein said association means includes display changing means for changing the displaying state of said display means so as to correspond to the position of said display means.

40. A camera according to claim 39, wherein said display changing means includes inverting means for inverting the displaying state of said display means in accordance with the position of said display means.

41. A camera according to claim 40, wherein said inverting means includes means for inverting top to bottom the displaying state.

42. A camera according to claim 41, wherein said inverting means includes means for reversing right to left displaying state.

43. A camera according to claim 40, wherein said inverting means includes means for reversing right to left displaying state.

44. A camera according to claim 39, wherein said display changing means includes switch means for making the displaying state of said display means correspond to the position of said display means.

45. A camera according to claim 33, wherein said association means includes display changing means for changing the displaying state of said display means.

46. A camera according to claim 45, wherien said display changing means includes switch means for changing the display state of said display means.

47. A camera according to claim 45, wherein said display changing means includes means for inverting top to bottom said displaying state.

48. A camera according to claim 47, wherein said display changing means includes means for reversing right to left the displaying state.

49. A camera according to claim 45, wherein said display changing means includes means for reversing right to left the displaying state.

50. A camera according to claim 46, wherein said switch means includes means for inverting top to bottom said displaying state.

51. A camera according to claim 50, wherein said switch means includes means for reversing right to left said displaying state.

52. A camera according to claim 46, wherein said switch means includes means for reversing right to left said displaying state.

53. A camera according to claim 13, wherein said association means includes means for automatically causing the association.

54. A camera according to claim 34, wherein said switch means includes means for reversing right to left said displaying state.

55. A camera comprising:
(a) display means for displaying an image;
(b) self-timer means for performing a self-timer photography; and
(c) means for changing a position of said display means in correspondence to an operation by said self-timer means.

56. A camera comprising:
(a) display means for displaying an image;
(b) remote control means for operaiton said camera by remote control; and
(c) means for changing a position of said display means in correspondence to the operation by said remote control means.

57. A camera comprising:
(a) display means for displaying an image, said display means being provided on an upper portion of said camera and having one surface for displaying; and
(b) means for changing a position of said display means, said position changing means enabling said display means to a take a first position where the displaying surface is directed upward above said camera, a second position different from said first position by rotation about a portion of said display means on the rear side of the camera, and a third position different from said first position by rotation about a portion of said display means at the front side of the camera so as to direct the displaying surface toward the front side of the camera.

58. A camera according to claim 57, wherein said position changing means includes first hinge means for rotating said displaying means from the first position to the second position, and second hinge means for rotating said display means from the first position to the third position.

59. A camera according to claim 57, wherein said position changing means includes first means for rotating said display means about a central portion thereof with a rotation axis being in the top-bottom direction of the camera and second means for rotating said display means about a side portion thereof with a rotation axis being at about 90° angle relative to said rotation axis in the top-bottom direction of the camera.

* * * * *